United States Patent Office 3,065,662
Patented Nov. 27, 1962

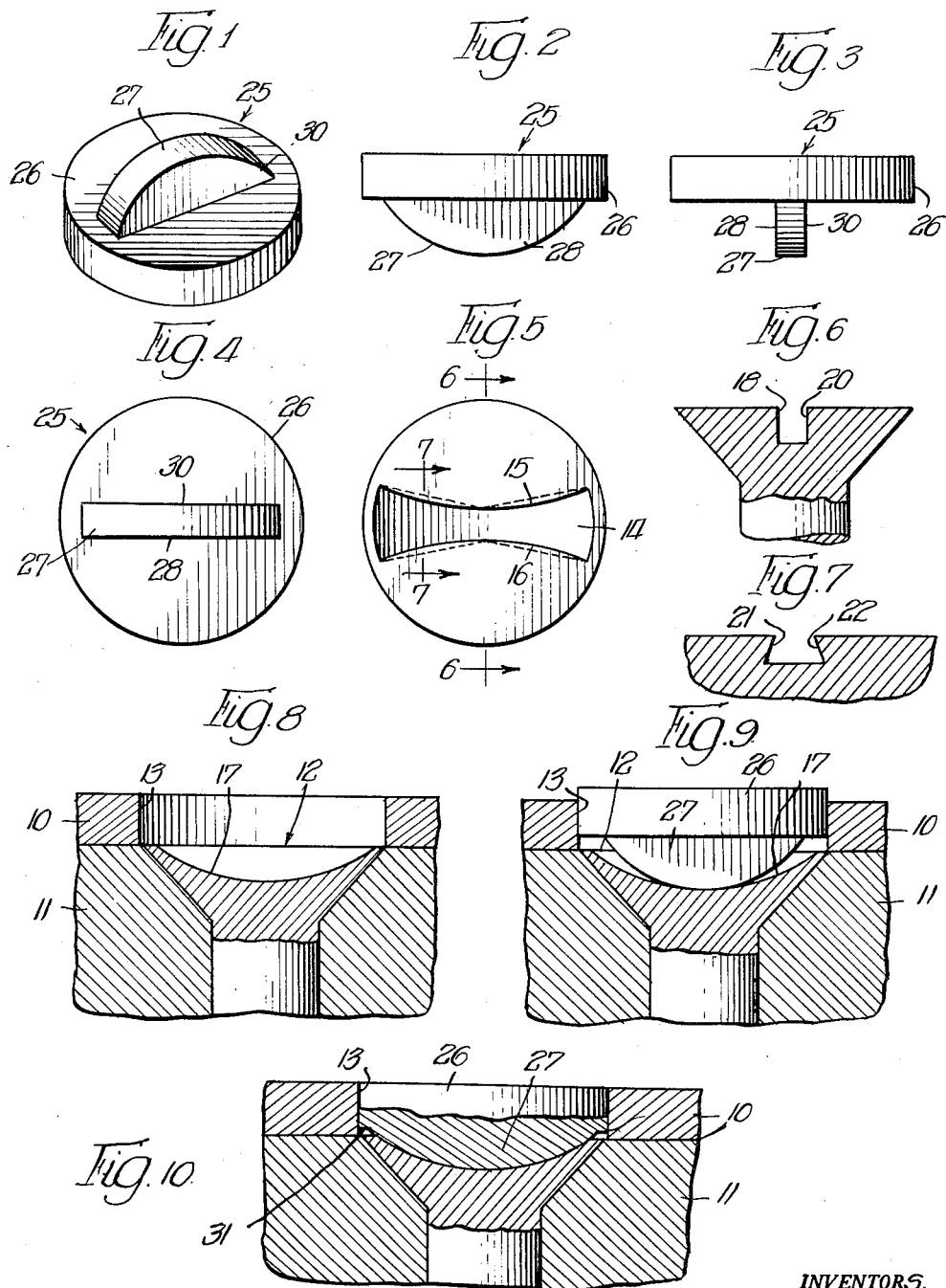

3,065,662
PLUG MEANS FOR COUNTERSUNK FASTENERS HAVING RECESSED HEADS
Thomas F. Spoehr and John Burt, Los Angeles County, Calif., assignors to Voi-Shan Industries, Inc., Los Angeles, Calif., a corporation of Illinois
Filed Aug. 28, 1959, Ser. No. 836,762
1 Claim. (Cl. 85—41)

This invention relates to button-like plugs for securely and snugly closing or plugging the recesses or cavities above recessed fastener heads while becoming securely interlocked with undercut or dovetail driving recesses in the fastener heads.

While the present invention has particular application to air space vehicles or vehicles capable of free flight, e.g. airplanes, rockets, guided missiles, etc., it also has other applications in situations where there is a need to fill up the recess or hole above the head of a recessed fastener. Such other uses would include the outer surface and structures of boats, the inner linings of process tanks, etc.

In accordance with the present invention the fastener heads with which the invention is useful are of the type having an undercut or dovetail driving recess, and the button-like plugs for closing the space or recess above such a countersunk or recessed head are of the type having a deformable projection portion which can be readily deformed into permanent interlocking engagement with such driving recesses.

The object of the invention is the provision of button-like plugs of the class described for closing the holes or recesses remaining above the heads of fasteners which are recessed in work pieces and which heads have undercut driving recesses, the button-like plugs being characterized by being easily and cheaply mass produced, readily installed, and interlockable with the undercut driving recesses of the fastener heads independently of adjacent parts of the work piece or pieces.

Certain other objects of the invention will, in part, be obvious and will in part appear hereinafter.

For a more complete understanding of the nature and scope of the invention reference may now be had to the following detailed description thereof taken in connection with the accompanying drawings wherein:

FIG. 1 is a bottom perspective view of a button-like plug forming one embodiment of the invention;

FIG. 2 is a side elevational view of the button-like plug for recess-closing shown in FIG. 1, with the bottom projection turned to its long side;

FIG. 3 is a side elevational view of the plug taken at right angles to the view shown in FIG. 2 and showing the width or narrow dimension of the bottom projection;

FIG. 4 is a bottom plan view of the button-like plug;

FIG. 5 is a top plan view of the flat head of a fastener or screw having an undercut driving recess of preferred formation and configuration formed therein;

FIG. 6 is a vertical sectional view taken on line 6—6 of FIG. 5;

FIG. 7 is a fragmentary detailed sectional view taken on line 7—7 of FIG. 5;

FIG. 8 is a fragmentary vertical sectional view through a portion of two work pieces having a recessed fastener head therein with an unfilled counterbore or recess above the head and illustrating one typical requirement for the present invention;

FIG. 9 is a view similar to FIG. 8 but showing one of the button-like plugs of FIGS. 1–4 in place in the counterbore or recess to be plugged or filled; and FIG. 10 is a view similar to FIGS. 8 and 9 but showing the button-like plug in its fully installed condition.

Referring first to FIG. 8 of the drawing, a work piece such as the outer shell or "skin" of an airplane or other air space vehicle is designated at 10, while another work piece such as an inner rigid structural member is indicated at 11. The term work piece is used generally to refer to various parts and members in connection with which fasteners are used. The head 12 of a fastener in the form of a screw with a flat head, is shown recessed in the work pieces 10 and 11. In this particular instance the head of the screw 12 is flush with the top surface of the work piece 11 and the bottom of the work piece 10. The work piece 10 is counterbored at 13 to provide for recessing the screw head 12.

The problem is to provide inexpensive means for filling, closing or plugging the recess or cavity 13, preferably providing a surface which bridges the top of the opening in work piece 10 so as to provide a continuous unbroken surface for all intents and purposes. Heretofore, various expedients have been resorted to, for meeting this problem, none of which has proved to be a very satisfactory solution for one reason or another. In this connection, it must be borne in mind that these recesses occur in the thousands and tens of thousands on a large air space vehicle such as a large airplane. Therefore, to be acceptable and practical any filling or plugging device must be not only inexpensive but something that can be installed on a mass basis in a positive manner without damaging the skin or outer layer of the plane or other vehicle. In the past, counterbore recesses such as the space or recess 13 have been filled by using plugs which are retained in place by cements of various types. In other instances, holes have been drilled into the sides of the recesses in the work pieces and plugs having projections for fitting into these holes have been used. Various other expedients have also been tried.

In the present invention the problem of filling the work-piece recess 13 has been satisfactorily solved, in part, by employing a fastener the head of which has an undercut driving recess and, in part, by using a special button-like plug in connection therewith.

Reference may now be had to FIGS. 5–7 for a detailed description of the fastener head 12 having such a recess. The fastener head 12 and the recess 14 therein conform to the driving recess and screw head described in detail and claimed in Vaughn Patent 2,677,985. Fasteners with this type of recess have been used commerially, particularly in the air frame industry, being available under the trademark "Hi-Torque." The recess in such a fastener is referred to as a "Hi-Torque" recess. The recess 14 is characterized by a top entry opening formed by two arcuate sides 15 and 16 which are turned so as to face in opposite directions, by an arcuate bottom 17 (FIGS. 7 and 8) which is deepest in the middle and shallow at the ends, and by side walls which are approximately vertical adjacent the center or middle as indicated at 18 and 20 in FIG. 6 but which are overhanging, dovetailed or undercut intermediate the middle and the outer ends as indicated at 21 and 22 in FIG. 7. The manner in which an undercut driving recess of the foregoing type may be formed is described in detail in said Patent 2,677,985.

Another form of undercut or dovetailed recess for a fastener such as a screw is disclosed in O'Leary Patent 2,304,704. The O'Leary recess is said to be formable by a heading process as distinguished from use of a cutter wheel as described in the Vaughn Patent 2,677,-985. In the O'Leary recess the dovetailed section occurs at the center portion and the degree of undercut or overhang diminishes as the ends of the recess are approached. Since the driving recesses of this general type may be formed either by a heading process, or by a milling or cutting process, the term "undercut" is used broadly herein and in the pending claims to designate a recess which has overhanging sides or which is dovetailed in cross section, regardless of the particular manner in which it is formed.

The button-like plug for closing the recess 13 and interlocking with the driver recess 14 in the fastener 12 is designated generally at 25 in FIGS. 1–4. It comprises a cylindrical or button-like body portion 26 from the underside of which protrudes an integral arcuate-shaped projection 27. The side walls 28 and 30 of the projection 27 are vertical and these walls are uniformly spaced apart so that the projection 27 has a uniform width.

The special plugs 25 are dimensioned so as to be used with various standard sizes of screw heads 12. As is well known, the screw heads of commercial fasteners are standardized and manufactured to predetermined specifications and tolerances, including the various dimensions of the driving recess 14. The projections 27 on the underside of the plugs 25 are shaped and dimensioned so as to correspond to the various driving recesses 14, or other driving recesses which may be used. In other words, for each different screw head and driving recess there will be one or more plugs 25 each having a projection 27 sized and dimensioned so that the projection 27 will initially fit into the recess as illustrated in FIG. 9 and be deformable into interlocking engagement therein. Depending on the depth of the recess 13 the plug 25 will be so dimensioned that the top surface of the plug portion 26 will initially lie above the surface of the work piece 10. The projection 27 will be deformable upon application of pressure from the top coaxial with the axis of the fastener so as to fill and interlock with the driving recess 14 as shown in FIG. 10.

It will be seen from FIG. 9 that the radius and curvature of the bottom arcuate of the projection 27 is shorter than the radius of curvature of the arcuate bottom surface of the driving recess 17 of the driving recess 14. The width of the projection 27 as viewed in FIGS. 3 and 4 is slightly less than the width of the driving recess 14 at the narrowest point (i.e. at the center). In addition, the depth or vertical dimension of the projection 27 exceeds the depth of the recess 14. Accordingly, the projection 27 will readily enter the recess 14 but will hold the underside or bottom surface of the button portion 26 a substantial distance above the top surface of the screw head, as shown in FIG. 9. With one of the plugs 25 in place in the recess 13 as illustrated in FIG. 9, pressure (either squeezing or impact type) is applied to the top surface of the button and this will deform the projection 27 into the relatively harder material of the fastener head 12 so that the material of the projection 27 will cold flow underneath the undercut or dovetailed portions and preferably substantially fill the driving recess 14. The pressure may be applied by a spring loaded hammer, for example having a head surface which is larger than the top surface of the button portion 26. Accordingly, when the top surface of the button 25 is flush with the top surface of the work piece 10, further driving of the plug 25 will be arrested. If desired a platen may be applied to the protruding head of the plug 25 and a hammer used to strike the platen. This later procedure will prevent marring of the surface of the work piece 10 by impact blows. If desired, the hair-like seam between the top surface of the button portion 26 and the adjacent surface of the work piece 10 may be lapped or worked so as to completely close the seam and in effect make the surface continuous and integral.

Preferably, the button portion 26 has such a depth or thickness that when seated or installed in a recess of the depth of recess 13, there will be a space between the underside of the button portion 26 and the top of the fastener head after the button-like plug has been fully driven home, this space being indicated in FIG. 10 at 31. The advantage of leaving or providing for the space 31 is that it permits the top surface of the plug 25 to be brought flush with the top surface of the work piece 10 before the recess 13 is completely filled thereby preventing further driving. If after the projection 27 has deformed so as to fully fill the driving recess 14, it is still necessary for the plug to be driven in a way to obtain a flush fit at the top surface, the space 31 permits the material of the projection 27 to deform and cold flow around the driving recess thus permitting further inward movement of the button portion 26.

It will be apparent to those skilled in the art of fastener design that by having the projections 27 of different depths and the button portions 26 at different thicknesses, it will be readily possible to fill up recesses in work pieces of varying depths.

The button-like plugs 25 may be mass produced using automatic header or stamping type equipment. A variety of materials may be used but usually the plugs 25 will be formed of a metal which is appreciably softer than that from which the fasteners 12 are formed. For example, in the air frame industry, the fasteners 12 will normally be formed of high strength, lightweight steel alloys or from a strong lightweight metal such as titanium. With the fasteners 12 being formed of such materials, the button-like plug 25 may be advantageously formed of aluminum or magnesium, for example. Since the outer skin or shell 10 of a wing or fuselage will normally be formed of aluminum, the aluminum plugs 25 will blend in particularly well. However, it will be understood that the invention is not limited to the use of any particular material and that metals other than aluminum and magnesium may be used in making the plugs 25.

As pointed out above, the invention is not limited to any particular form of undercut recess 14 although the Hi-Torque recess is preferred. The requirement is that the driving recess of the fastener be undercut or dovetailed at least for a portion of its length. Those skilled in this art will readily be able to design appropriate sized and shaped projections 27 for other different types of recesses 14 taking into consideration the amount of deformation that is required and pressures available to obtain good locking engagement.

The button-like plugs 25 when used in combination with fasteners having driving recesses of the undercut or dovetailed type offer the following advantages: interlocking action is obtained completely independent of the counterbored hole 13 or other adjacent areas or parts; locking action is positive and is known to be obtained when the top surface of the button is flush with the top surface of the work piece, thus making inspection easy; the button-like plugs are easily and quickly inserted and set; and, a completely smooth uninterrupted surface is readily attained.

Since the fastener head driving recesses may be slightly underfilled or slightly overfilled without materially affecting the degree of interlocking engagement, the unit tolerances for the button-like plugs 25 are not highly critical. Upon the plugs 25 being inserted and driven, the job is finished except for any polishing or lapping that may be desired, and fluid-tight fits are readily obtainable without any extraneous materials being used and without any time delays being involved for materials to set or harden. Direct use of mechanically deformable retained material of greater strength, temperature resistance, formability, controllability with complete usage confidence levels is permitted.

The plugs 25 once inserted in effect become a part of the work piece structure and various parts may be attached to these head portions 26 either before or after they have been set, or these head portions may be simply treated as part of the exposed unbroken surface of the outer shell or skin 10 without care having to be taken to avoid drilling, working or attaching things to these button areas.

Obviously, the button portions 26 do not have to be round but can have any shape such as square, as long as it conforms to the recess or opening to be filled. The button portions 26 do not have to be flat, but can be initially curved, or curved during setting to conform to a curved work surface.

Since the above-mentioned and other changes may be made without departing from the spirit and scope of this invention, the foregoing description and detailed disclosure of a presently preferred embodiment is intended to be interpreted as illustrative and not in a limiting sense.

We claim:

In combination with a fastener the flat head of which is disposed below the top surface of at least one work piece in a fastener head recess therein, a button-like plug for closing said fastener head recess above said head, said fastener having an undercut driving recess characterized by a top entrance opening having oppositely turned arcuate sides whereby the recess is narrow at the middle and flared out at the ends, having an arcuate bottom which is deepest at the middle and shallowest at the ends, with the side walls being approximately vertical adjacent the middle and being undercut or dovetailed intermediate the middle and the outer ends, and said plug having a cylindrical body portion plugging said fastener head recess and a solid projection on the underside thereof deformed into substantially complete filling locking engagement within said driving recess, said projection prior to deformation characterized by having an arcuate bottom surface with a shorter radius of curvature than that of said driving recess arcuate bottom, having side walls which are vertical and parallel with a width therebetween allowing entrance into said driving recess, and having a depth exceeding the depth of said driving recess whereby upon application of deformation pressure in a direction coaxial with the axis of said fastener said projection is deformed so as to substantially fill said driving recess and interlock said plug with said fastener head the top surface of said plug body portion being substantially flush with the top surface of the uppermost work piece and the underside of said plug body portion being spaced above said flat head of said fastener.

References Cited in the file of this patent

UNITED STATES PATENTS

| 848,003 | Braunschweig | Mar. 26, 1907 |
| 918,522 | Faller | Apr. 20, 1909 |
| 1,296,165 | Costuma | Mar. 4, 1919 |
| 1,690,240 | Norcross | Nov. 6, 1928 |
| 2,050,993 | Bush | Aug. 11, 1936 |
| 2,182,092 | O'Leary | Dec. 5, 1939 |
| 2,677,985 | Vaughn | May 11, 1954 |

FOREIGN PATENTS

| 319,174 | Italy | July 3, 1934 |
| 790,051 | Great Britain | Feb. 5, 1958 |

OTHER REFERENCES

Hodgson: abstract of application Serial No. 628,044, published May 20, 1952, 658 O.G. 915.